United States Patent
Berfeld et al.

(10) Patent No.: US 10,164,980 B1
(45) Date of Patent: Dec. 25, 2018

(54) METHOD AND APPARATUS FOR SHARING DATA FROM A SECURED ENVIRONMENT

(71) Applicant: EMC Corporation, Hopkinton, MA (US)

(72) Inventors: Yuri Berfeld, Ottawa (CA); Luis Miguel Huapaya, Gloucester (CA)

(73) Assignee: EMC IP HOlding Company LLC, Hopkinton, MA (US)

( * ) Notice: Subject to any disclaimer, the term of this patent is extended or adjusted under 35 U.S.C. 154(b) by 294 days.

(21) Appl. No.: 15/164,188

(22) Filed: May 25, 2016

Related U.S. Application Data (63) Continuation of application No. 14/071,254, filed on Nov. 4, 2013, now Pat. No. 9,396,349.

(60) Provisional application No. 61/721,802, filed on Nov. 2, 2012.

(51) Int. Cl.
*H04L 29/06* (2006.01)
*G06F 21/60* (2013.01)

(52) U.S. Cl.
CPC ............ *H04L 63/10* (2013.01); *G06F 21/602* (2013.01); *H04L 63/0428* (2013.01); *H04L 63/20* (2013.01)

(58) Field of Classification Search
CPC ..... H04L 63/10; H04L 63/20; H04L 63/0428; G06F 21/602
See application file for complete search history.

(56) References Cited

U.S. PATENT DOCUMENTS

| | | | | |
|---|---|---|---|---|
| 6,233,684 B1* | 5/2001 | Stefik | ................ | G06F 17/30017 380/54 |
| 6,785,728 B1* | 8/2004 | Schneider | ............ | H04L 63/0218 709/229 |
| 9,400,891 B2* | 7/2016 | Stephens | ............. | G06F 21/6209 |
| 9,558,202 B2* | 1/2017 | Lockhart | ........... | G06F 17/30174 |
| 2004/0143736 A1* | 7/2004 | Cross | ................ | G06F 17/30067 713/165 |
| 2004/0193673 A1* | 9/2004 | Samji | ................ | G06F 17/30126 709/200 |
| 2012/0331108 A1* | 12/2012 | Ferdowsi | ................ | H04L 67/06 709/219 |

* cited by examiner

*Primary Examiner* — Robert B Leung
*Assistant Examiner* — Thomas Ho
(74) *Attorney, Agent, or Firm* — Krishnendu Gupta; Konrad R. Lee (57) ABSTRACT

A method for sharing data from within a secure network perimeter includes providing a sharing folder associated with a first user for transferring data therefrom to destinations outside the secure perimeter. Data stored within the sharing folder is stored in a secured fashion. Semi-trusted applications are provided an ability to retrieve the secured data in a unsecured fashion for sharing of same. The semi-trusted applications are other than able to retrieve and share secured data from at least a folder other than the sharing folder in unsecured form.

13 Claims, 8 Drawing Sheets

METHOD AND APPARATUS FOR SHARING DATA FROM A SECURED ENVIRONMENT

This application is a continuation of U.S. patent application Ser. No. 14/071,254, filed on Nov. 4, 2013, which claims the benefit of U.S. Provisional Application No. 61/721,802, which was filed on Nov. 2, 2012.

FIELD OF THE INVENTION

The invention relates to computer security and more specifically to sharing of data outside a secured computer environment.

BACKGROUND OF THE INVENTION

In computer security the use of encryption to protect files is well known. Examples of file encryption technologies abound, but today AES, DES and RSA are three of the most common encryption processes used. File encryption allows a user to protect a file against unwanted access. It is often used to protect against a specific threat. For example, PGP—an implementation of public-private key security—is often used to send files across the Internet to prevent interception of the files. Encryption is also used to secure files stored locally on a USB memory stick or on a local hard drive. Further encryption is used to protect passwords and other codes stored in non-volatile memory.

One interesting application for encryption is to provide an encryption layer for a storage device such that everything within the storage device is encrypted. Unfortunately, most systems employing this type of security de-secure the entire device for use thereof. Thus, the device is secured when not in use and unsecure when in use. This ensures convenience and ease of use as well as protecting a device against physical theft.

If data within a secure environment is not de-secured for use thereof, the data remains obfuscated and is non-accessible. Accessing data on a file-by-file basis when needed maintains a higher level of security, but prohibits files from being shared between users and systems.

It would be advantageous to provide a method and system supporting secure data storage and sharing of data between systems and users, which overcomes at least some of the above-mentioned limitations of the prior art.

SUMMARY OF EMBODIMENTS OF THE INVENTION

According to an aspect of an embodiment of the instant invention, there is provided a method comprising: providing a security layer for maintaining security within a security perimeter; providing a first set of folders having secured data stored therein; selecting first secured data for sharing thereof outside the security perimeter; embedding a link within a message, the link for use in accessing the first secured data; activating the link; and in response to activating the link, accessing the security layer to receive access to the first secured data outside the security perimeter.

According to an aspect of an embodiment of the instant invention, there is provided a method comprising: providing a security layer for maintaining security within a security perimeter; providing a first set of folders having secured data stored therein; providing a sharing folder having secured data stored therein; providing trusted applications for accessing stored secured data from within the first set of folders, the stored secured data stored in a ciphered form and deciphered by the security layer when accessed by a trusted application; and providing semi-trusted applications other than for accessing stored secured data deciphered by the security layer from within the first set of folders and for accessing first secured data from within the sharing folder, the first secured data stored in a ciphered form and deciphered by the security layer when accessed by a semi-trusted application, the semi-trusted applications for sharing the deciphered first secured data with a destination outside the security perimeter.

In some embodiments secured data comprises stored ciphered data, the stored ciphered data secured with a cipher key.

In some embodiments a semi-trusted application is provided access to deciphered data from a ciphered data file by the security layer when the cipher data file is stored within the sharing folder and is other than provided access to a deciphered version of an exact same data file as the ciphered data file by the security layer when the exact same data is stored outside the sharing folder.

In some embodiments the security layer acts to decipher data for trusted applications and to only decipher data for semi-trusted applications when that data is stored within a sharing folder.

In some embodiments the security perimeter is a virtual security perimeter defining a virtual communication network having data secured therein.

In some embodiments the method comprises initiating copying of secured data from within the security perimeter outside the sharing folder to within the security perimeter within the sharing folder; and in response to copying of the secured data, generating a log entry.

In some embodiments the method comprises initiating copying of the secured data from within the security perimeter outside the sharing folder to within the security perimeter within the sharing folder; and in response to initiating copying of the secured data, requesting user authorization data, the user authorization data for authorizing a copying operation.

In some embodiments the method comprises initiating copying of the secured data from within the security perimeter outside the sharing folder to within the security perimeter within the sharing folder; and in response to initiating copying of the first ciphered data file, requesting user authorization data, verifying the user authorization data, and in response to verifying the user authorization data, authorizing the initiated copying operation.

In some embodiments the method comprises initiating copying of the secured data from within the security perimeter outside the sharing folder to within the security perimeter within the sharing folder; and in response to initiating copying of the secured data, verifying the operation against policy data to determine an authorization result for the copy operation, and in response to determining that the copying should other than be authorized, preventing the initiated copying operation; and in response to determining that the copying should be authorized, authorizing the initiated copying operation.

In some embodiments verifying the operation against policy data comprises one of determining if a maximum number of file copy operations to the sharing folder is exceeded, determining if a given file is sharable, determining if a given individual has authorization to share a given file, and determining if sharing of the file is being performed within suitable sharing hours.

In some embodiments the method comprises generating a log entry when a first ciphered data file is one of moved and copied to the sharing folder within the security perimeter.

In some embodiments the operating system within which the security perimeter is in operation comprises a Windows® operating system.

In some embodiments the semi-trusted applications support file communication for sharing of deciphered file data outside the security perimeter.

In accordance with another embodiment there is provided a method comprising: providing a security layer for maintaining security within a security perimeter; providing a sharing folder within the security perimeter; providing a first ciphered data file stored within the security perimeter outside the sharing folder, the first ciphered data file secured according to a first security protocol and accessible to trusted applications and other than accessible to semi-trusted applications in a deciphered form; providing a second ciphered data file stored within the security perimeter and within the sharing folder, the second ciphered data file secured according to the first security protocol and accessible to semi-trusted applications in a deciphered form; and ciphering and deciphering of files performed by the security layer, the security layer supporting access control based on a location of a ciphered file and a trust level of an application accessing said file.

In some embodiments the first ciphered data file and the second ciphered data file are exact copies of each other stored in each of two different locations.

In some embodiments the semi-trusted applications are provided access to the first ciphered data file in its ciphered form.

In some embodiments the trusted applications are provided access to the second ciphered data file in its deciphered form.

In some embodiments the method comprises initiating copying of the first ciphered data file from within the security perimeter outside the sharing folder to within the security perimeter within the sharing folder; and in response to copying of the first ciphered data file, generating a log entry.

In some embodiments the method comprises initiating copying of the first ciphered data file from within the security perimeter outside the sharing folder to within the security perimeter within the sharing folder; and in response to initiating copying of the first ciphered data file, requesting user authorization data, the user authorization data for authorizing a copying operation.

In some embodiments the method comprises initiating copying of the first ciphered data file from within the security perimeter outside the sharing folder to within the security perimeter within the sharing folder; and in response to initiating copying of the first ciphered data file, requesting user authorization data, verifying the user authorization data; and in response to verifying the user authorization data, authorizing the initiated copying operation.

In some embodiments the method comprises initiating copying of the first ciphered data file from within the security perimeter outside the sharing folder to within the security perimeter within the sharing folder; and in response to initiating copying of the first ciphered data file, verifying the operation against policy data to determine an authorization result for the copy operation;

in response to determining that the copying should other than be authorized, preventing the initiated copying operation and in response to determining that the copying should be authorized, authorizing the initiated copying operation.

In some embodiments verifying the operation against policy data comprises one of determining if a maximum number of file copy operations to the sharing folder is exceeded, determining if a given file is sharable, determining if a given individual has authorization to share a given file, and determining if sharing of the file is being performed within suitable sharing hours.

In some embodiments the method comprises generating a log entry when a first ciphered data file is one of moved and copied to the sharing folder within the security perimeter.

In some embodiments the operating system within which the security perimeter is in operation comprises a Windows® operating system.

In some embodiments the semi-trusted applications support file communication for sharing of deciphered file data outside the security perimeter.

In accordance with another embodiment, there is provided a method comprising: providing a security layer for maintaining security within a security perimeter, the security layer for ciphering and deciphering of files; providing a sharing folder within the security perimeter; providing a first ciphered data file stored within the security perimeter outside the sharing folder, the first ciphered data file secured according to a first security protocol and in dependence upon a first cipher key and accessible to trusted applications via the security layer and other than accessible to semi-trusted applications in a deciphered form via the security layer; and, providing a second ciphered data file stored within the security perimeter and within the sharing folder, the second ciphered data file secured according to the first security protocol and in dependence upon the first cipher key and accessible to semi-trusted applications in a deciphered form via the security layer.

In some embodiments the semi-trusted applications support file communication for sharing of deciphered file data outside the security perimeter.

In accordance with another embodiment there is provided a method comprising: providing a security layer for maintaining security within a security perimeter; providing a set of folders having secured data stored therein; providing a trusted application for accessing stored secured data from within the set of folders, the stored secured data stored in a ciphered form and deciphered by the security layer when accessed by the trusted application and re-secured when stored by the trusted application, the security layer for automatically other than ciphering of data stored by the trusted application in a predetermined file type; providing a non-trusted application for accessing data stored in plain text and other than for accessing data deciphered by the security layer; accessing a first data file by the trusted application, the first data file forming at least a portion of the stored secured data and being other than the predetermined file type; and using the trusted application, storing a second data file of the predetermined file type, the second data file based on the first data file, the security layer for securing the first data file when saved and for other than securing the second data file.

In some embodiments the method comprises accessing the second data file by the non-trusted application.

In some embodiments the method comprises verifying the storing of the second data file of the predetermined file type against policy data to determine an authorization result, and in response to determining that the storing should other than be authorized, preventing the storing of the second data file.

In some embodiments verifying comprises analyzing a content of the second data file against an expected content of the second data file.

In some embodiments the method comprises, in response to storing the second data file of the predetermined file type, generating a log entry.

In some embodiments the predetermined file type is an exception defined by the security layer.

In accordance with an embodiment, there is provided a method comprising: providing a security layer for maintaining security within a security perimeter; providing a ciphered data file stored within the security perimeter, the ciphered data file secured according to a security protocol and accessible to a trusted application and other than accessible to a non-trusted application in a deciphered form; accessing by the trusted application the ciphered data file, comprising deciphering the ciphered data file by the security layer when the ciphered data file is accessed by the trusted application; initiating storing by the trusted application a plain-text data file based on the ciphered data file, the plain-text data file being a file type different than the ciphered data file, and the file type being an exception defined by the security layer; analyzing data of the plain-text data file; and based on the analyzing, determining a risk associated with storing the plain-text data file.

In some embodiments the method comprises storing the plain-text data file when the determined risk is within a predetermined range of values.

In some embodiments the method comprises accessing the plain-text data file by the non-trusted application.

In some embodiments the method comprises, in response to storing the plain-text data file, generating a log entry.

In some embodiments the method comprises other than storing the plain-text data file when the determined risk is outside a predetermined range of values.

In accordance with an embodiment there is provided a method comprising: providing a security layer for maintaining security within a security perimeter, the security layer for ciphering and deciphering of data files, the security layer for ciphering of all data files stored by trusted applications; defining a security layer exception supporting storing by trusted applications of data files of a predetermined file type in plain-text form, the predetermined file type having a known data structure; in response to a call by a trusted application to store in plain-text form a data file of the predetermined file type, analyzing the data structure of the data file to determine a risk associated with storing the data file in plain text.

In some embodiments analyzing comprises determining if the data file includes data other than data of the known data structure.

In some embodiments the method comprises storing the data file in plain-text form when it is determined that the data file other than includes data other than data of the known data structure.

In some embodiments the method comprises accessing the data file in plain-text form by the non-trusted application.

In some embodiments the method comprises performing a security action when it is determined that the data file includes data other than data of the known data structure.

In some embodiments the security action comprises generating a log entry.

In some embodiments the method comprises generating a log entry when it is determined that storing the data file results in risk beyond a known level.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Many of today's security threats come from within our networks. Malware—malicious executables—are imported to our networks in a variety of ways. Once inside, they "listen" for access keys, passwords, and other security data and they copy data from within the network to locations outside the network. As long as data is in plain text or keys are accessible, the data exported will be in plain text and will be useful outside of the network.

Further, these attacks try to circumvent security processes to make detection and monitoring of their activity nearly impossible. Of course, it is difficult to address an unknown threat and even more difficult when it is hard to notice, even when it is successfully compromising network security. As such, there is considerable effort being focused on ensuring that executables such as viruses cannot enter computer systems. As the news has informed most of us, these efforts are not completely successful and, as such, a better method to protect secure data is sought.

Figure 1:
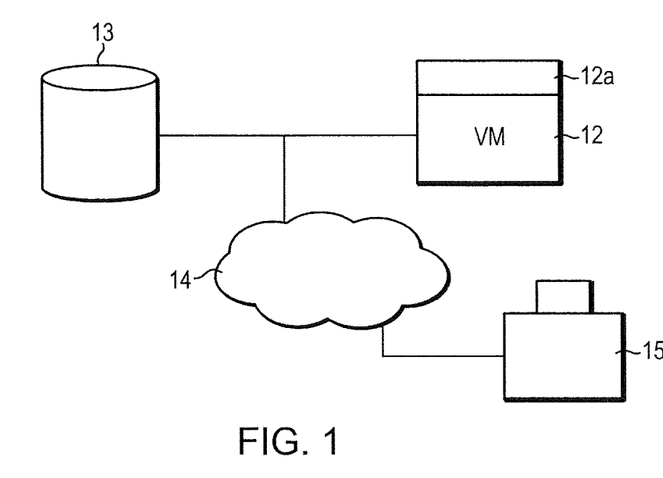
FIG. 1 is a simplified diagram of a closed secure network implemented within the cloud.

Referring to FIG. 1, shown is a closed secure system implemented within the cloud. Of course, the system is equally implementable local to a secure network. The system comprises storage 13, a virtual machine 12, an encryption layer 12a for encrypting and decrypting all data stored within the storage 13 of the secure system. The system is coupled via a WAN 14 to workstations 15. Thus, every file or record when modified is secured and then stored in its secured form. In order to re-access the file, the file must first be deciphered and then provided to an application for accessing same. So long as the application is trusted, the resulting hand off of the plain text data is secure.

The application operates to modify and save the modified data. When the modified data is saved, it is re-encrypted and stored within the secure network—within the secure perimeter.

When an application or a process that is not trusted seeks to access file data, the data remains encrypted—a security layer does not convert the data into plain-text—and is therefore inaccessible in its plain-text form. Thus, an untrusted piece of Malware could export much of the file data past the security perimeter of the secure system and still not provide access to the plain-text version of said data. So long as the Malware does not have access to the security functions and the secret keys, the data is safe from bulk export.

Unfortunately, due to the existing expectation of open communication and collaboration a lot of applications support transferring of digital data to other users. As such, an application like Firefox®, if trusted, could access an electronic mail site and a user could email a file from within the organization—within the security perimeter—to a point outside the organization; because the application is trusted, the file is deciphered before being provided to the application—Firefox®. Thus, security can be breached relatively easily using trusted applications. Currently, either an organization ciphers all its data and does not allow emailing of files and out of network communication—web browsers, email software, and communication applications are not trusted—or, alternatively, the organization allows files to be freely moved out of the security perimeter in a plain text format. Even if the organization seeks to secure outgoing email, the file once decrypted at its destination is accessible to everyone and could be disseminated. Once again, a malware or a user need only know a secure endpoint in order to transmit the data in its secured format. Thus, compromise of any "secure" key that is trusted by the organization leads to compromise of the entire organizations data. That said, the legitimate sharing of file data is necessary to most organizations and should be supported.

Figure 2:
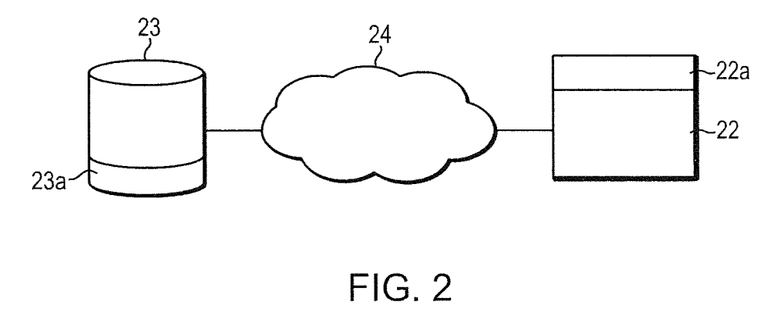
FIG. 2 is a simplified diagram of an open secure network implemented within the cloud.

Referring to FIG. 2, shown is network diagram wherein files are shared from a secure cloud based implementation of a file system. The file system is similar to that of FIG. 1 and comprises a storage 23, a virtual machine 22, and a security layer 22a. The system components communicate via a network, shown as WAN 24. Here the user is provided with a sharing folder 23a. To the sharing folder 23a is attached a plurality of policies. The policies dictate a series of security parameters surrounding file access within the sharing folder 23a. For example, a typical policy will log all files placed within the sharing folder 23a and all files retrieved from within the sharing folder 23a. Examples of further policies include deleting a file after it is used once, limiting a number of files that can be copied to the sharing folder 23a each day, restricting the type of files that can be placed in a sharing folder 23a, and so forth. Policies are enforced by the security layer 22a. Further optionally, the security layer 22a is the only way to access file data.

Figure 3:
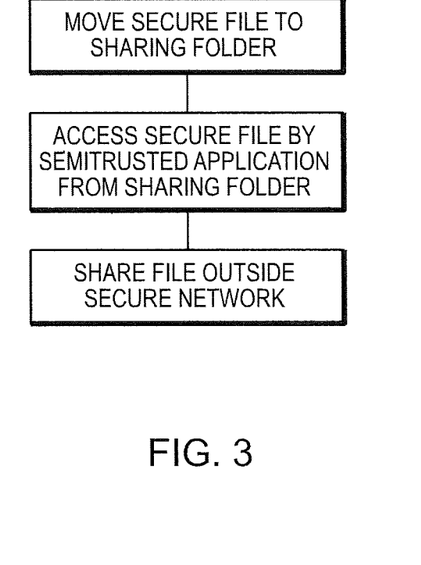
FIG. 3 is a simplified flow diagram of a method according to an embodiment of FIG. 2.

Referring to FIG. 3, shown is a flow diagram of a method according to the present embodiment. A user selects a file to share and drags it into their sharing folder. A typical sharing folder is associated with a single user, though in some embodiments a sharing folder is associated with a group of users and in other embodiments a sharing folder is associated with a task or project as well. The file copy operation is delayed while the policy engine logs the transaction and requests any further data that may be indicated under the policy. For example, a destination of the file is requested. Optionally, a confirmation is requested to ensure that the user knows that they are transferring the file for sharing outside the secure network. Once the policies are followed, the file is copied to the sharing folder for sharing therefrom. Further examples of policies include requesting a user password, escalating requirements and potentially inconvenience with increasing number of files shared in a given period of time, and so forth.

The user then accesses a semi-trusted application and retrieves the file. A semi-trusted application is typically an application for communication. It is typically not trusted because it has the capacity if fully trusted to leak secure data to outside the organization. That said, that is a purpose of the sharing folder so, within the sharing folder, the semi-trusted application is provided data access. It should be evident from what is written hereinabove that, for example, if Firefox® was fully trusted, secure data within the network would be deciphered into plaintext and Firefox® could then transmit that through a webmail interface outside the network. Thus, semi-trusted applications are not typically given access to secure data.

In the present embodiment, the semi-trusted application is provided full access to files within the sharing folder within any limitations set by policies. For example, the file access is noted when the policy engine again executes on the sharing folder. Alternatively, the policy engine is executed more or fewer times than disclosed herein. Further alternatively, the policy engine executes perpetually. The policy engine creates a log of the file access and then the security layer provides the file from the sharing folder as plain text to the semi-trusted application. The file can then be transmitted via email or FTP to another user or system outside the secure system.

Thus in accordance with the above described embodiment, the process for sharing secure data entails a user deciding to share data, moving the shared data to a sharing folder, and then sharing the data. Both the decision and the actual sharing of the data are optionally logged and further optionally policies are applied thereto.

Advantageously, an untrusted process accessing any of the data within the secure space only retrieves secured data; an untrusted process accessing any of the data within the sharing folder also only retrieves secured data. A semi-trusted application accessing any of the data within the secure space only retrieves secured data; and a semi-trusted application accessing data within the sharing folder supports transmission from the organization of file data, for example in plain-text. A trusted application can access data anywhere and typically is an application that does not support sharing of the data outside the secure network. Alternatively, trusted applications are not permitted to access data within the sharing folder.

Alternatively, a policy is implemented requiring all data moved from the sharing folder to be encrypted for its destination. In such an embodiment, a user would decide to share a file by moving it to the sharing folder. Once in the sharing folder, when the semi-trusted application accesses the file, the policy engine determines a recipient of the file, typically by asking or alternatively by getting destination information from the semi-trusted application and the file data is deciphered by the security layer and re-ciphered with security data of the destination. Advantageously, even the semi-trusted application cannot access the plain-text file data.

Alternatively, a policy is implemented requiring all data moved to the sharing folder to be encrypted for its destination. In such an embodiment, a user would decide to share a file by moving it to the sharing folder. The policy engine requests the intended recipient either by asking for their destination address or, for example, their key certificate. The file is deciphered by the security layer, re-encrypted using a key associated with the intended destination, re-encrypted with the security layer security and then stored in the sharing folder. Such a file is now accessible to semi-trusted applications, but even these cannot transmit the file for use by other than the intended recipient. Advantageously, even if the recipient's security was compromised, the one file is only accessible locally by the semi-trusted application and cannot be transmitted, by malware to outside the network in its unsecured form, whether plain-text or encrypted with a compromised cipher.

The term trusted application is used herein to refer to applications that are trusted. For example, an application is verified by security personnel and is then digitally signed. Each time the application is executed, the digital signature is verified in order to verify that the application is unaltered. An application once approved, is assigned a security level. It is either a security level application, system level application, trusted application, semi-trusted application or unapproved. Of course other methods for determining and enforcing trust of applications are applicable to the system and method described herein.

In an embodiment, the share folder is dedicated to a particular user or a particular user account. When this is the case, auditing of file access is simplified. Further, when this is the case one user sharing from the sharing folder a data file of another user is prevented. Because the applications accessing data within the sharing folder are semi-trusted, they are provided access to the sharing folder. It is advantageous to limit access to each file based on user permissions and the semi-trusted application; This is instead of modifying the applications to ensure that they don't leak data from the sharing folder that was placed there by other users. Advantageously, by providing a sharing folder for each user or user account, the semi-trusted application is executed without modification. Thus, sharing folder only exists within the local user profile and has access controls that allow only that user to access the files therein.

Optionally, the security process is configured to detect when new encrypted files are inserted within the sharing folder and as such, the security process does the following: generates an audit event showing that the file was submitted to be marked as shareable by the user on a given system— User X marked File Y as sharable on Computer Z; and depending on security policy settings, an authentication challenge is forced, asking for credentials of the user or alternatively of a permitted user where the user is unauthorized or the policy indicates credentials of another user are to be requested. Optionally, the authentication challenge asks for a reason to submit the file for sharing.

In the above noted embodiment, the semi-trusted application is a lot like a regular non-trusted application except that the semi-trusted application is able to read encrypted files when these files are stored within the sharing folder. Obviously, a security issue arises pertaining to the fact that once the semi-trusted application has read an encrypted file—the file is provided thereto in plain-text—it could then store the plain-text file persistently. However, as most probably the semi-trusted application is for communication, that which was once encrypted data is being sent out either in plain-text or for being deciphered into plain-text at the other end. In a typical email client implementation, the data is stored on the email server in plain-text. Further the plain-text data when communicated leaves a control perimeter of the secure network, for example an enterprise, and ends up within the control of an external target. As such, semi-trusted application behavior is typically considered acceptable. That said, a more rigorous testing of the semi-trusted application is advisable in some situations before it is converted from untrusted to semi-trusted status. Further, an audit trail is created for following the file. In dependence upon policies, a SecAdmin optionally requires further authentication prior to authorizing the potential security breach.

In some implementations, an authentication challenge is forced when the semi-trusted application attempts to access the encrypted file within the sharing folder instead of or as well as when the encrypted file is submitted into the sharing folder. This is useful when a file is submitted within the sharing folder and then accessed by multiple semi-trusted applications. An audit event is optionally created when a semi-trusted application accesses a file within the sharing folder.

Use of a semi-trusted application and a sharing folder allows file data to remain encrypted as much as possible. Trusted applications can access the file when encrypted. Optionally, trusted applications are provided access to the file within the sharing folder.

In accordance with a specific implementation relying on the Windows® operating system, an icon overlay is used to indicate that a file is encrypted—locked for access with a trusted application only. When the file is transferred to the sharing folder, the icon is optionally modified to indicate that semi-trusted and trusted applications can access said file. Thus, a user has a visual cue relating to file status. Files without the visual cue, are easily identified and optionally flagged to determine if any of them pose security threats.

A context sensitive menu is added, for example in response to a right mouse click, to allow files to be transferred to the sharing folder. Optionally, the context sensitive menu also provides access to reporting and other security file operations. Further optionally, some menu items perform complex functions. For example, an email file menu item causes a file to be transferred to the sharing folder and then attached to an outgoing email, automatically. Of course, policy based operations are automatically triggered and performed in accordance with the implemented embodiment. When complex menu items are implemented, the user is less inconvenienced than when they are required to perform two completely separate operations in order to share a file.

Because file data is encrypted, it is sometimes advantageous to provide a simple mechanism for viewing file description data such as author, and other annotations. This is optionally provided via a separate function, for example a menu item or triple click in cooperation with the security layer to decrypt and provide the file description data.

One process for auditing file transfers and enforcing policies relating thereto is to provide a process that watches or spies on each sharing folder and that responds to files being added or shared from each said folder. Optionally, each sharing folder is observed by a different process. Of course, any number of policies and policy triggers are supported. For example, policy triggers include one or more of the following: adding a file to the sharing folder, deleting a file from the sharing folder, accessing the file within the sharing folder with a trusted application, accessing the file within the sharing folder with a semi-trusted application, attempts to access the file within the sharing folder by untrusted applications and processes, and initiating transmitting the file outside the security perimeter in plain-text.

For example the security layer maintains an internal list of all files that are within the sharing folder to determine when new data is added, when data is removed and if an authentication challenge was performed.

User interface processes for supporting the above features are implemented. Policies requesting authentication are optionally supported with user interface elements as would other aspects of the above-described processes. Further, management and setup processes are optionally implemented to allow security administrators to manage policies and applications within the secure perimeter.

In another embodiment, files that are created or modified with a semi-trusted application are stored in association with a security level allowing either the semi-trusted application or all semi-trusted applications to access said file. Typically, trusted applications maintain the ability to access secured files. Alternatively, semi-trusted applications are replaced with applications having limited trust allowing for a plurality of application trust levels to be supported.

Optionally, an embodiment of the invention is implemented in another operating system such as UNIX, OS X, iOS, Android, etc.

As is evident from the above, because data files are stored ciphered, moving them from one folder to another or from one storage medium to another does not substantially affect security. It is the access to the files in plain text that defines the security perimeter. As such, even if files are moved to a backup storage location that is publically accessible, the ciphered files remain secured and therefore remain within a security perimeter.

Figure 4:
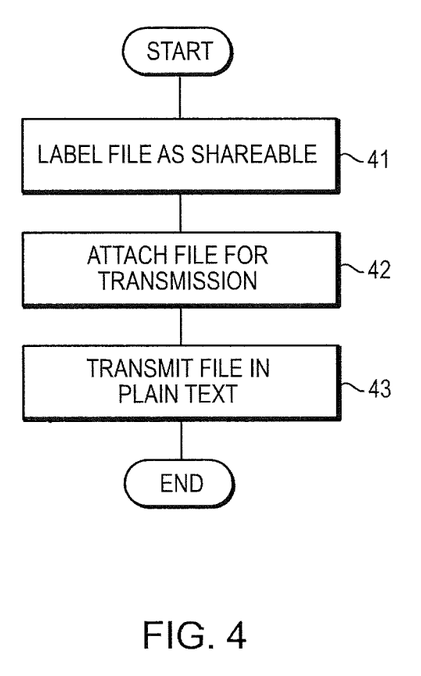
FIG. 4 is a simplified flow diagram of a method according to another embodiment employing a virtual magic folder.

Referring to FIG. 4, shown is yet another embodiment. Here, each file is stored in situ in accordance with security policies of the security layer. Thus files are either secured or unsecured. Those files that are secured are accessible to trusted applications via the security layer and are maintained within the secure perimeter through limited access to the security layer and/or security keys used thereby.

As shown, a file to be shared is selected and labeled as shareable at 41. The file, once so labeled is effectively within a virtual magic folder. The virtual magic folder is similar to the magic folder of earlier embodiments, but does not require that the file be moved from its original location.

When the file is attached for transmission to another user at 42, for example via email, the security layer verifies that the email application is semi-trusted, that the file is within the virtual magic folder and attaches the file in plain text within the email. Optionally security policies are applied prior to attaching the file to the email in plain text. For example, at least one of the recipient, the sender and the file is assessed for security concerns.

The file in plain text is then transmitted at 43 to the recipient. Upon receiving the email, the recipient accessed the attached file that is attached in plain text.

Figure 5:
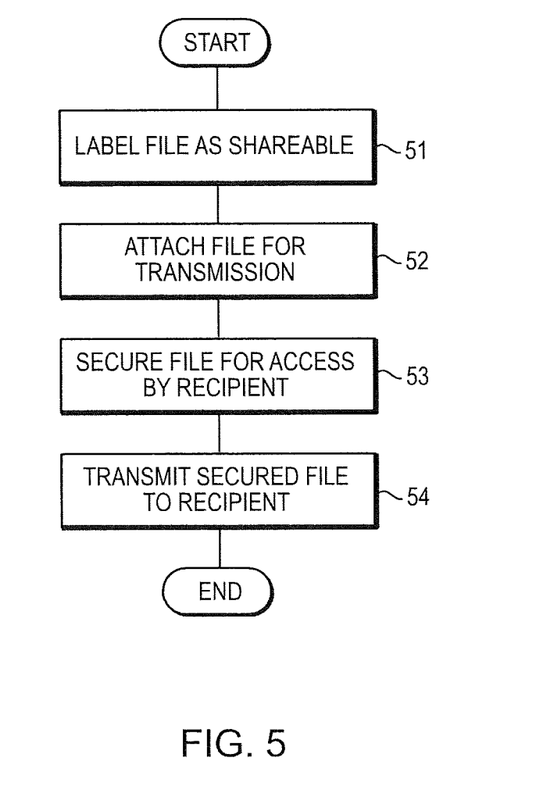
FIG. 5 is a simplified flow diagram of a method according to another embodiment wherein files are re-secured for being accessed by the recipient.

Referring to FIG. 5, shown is yet another embodiment. Here, each file is stored in situ in accordance with security policies of the security layer. Thus files are either secured or unsecured. Those files that are secured are accessible to trusted applications via the security layer and are maintained within the secure perimeter through limited access to the security layer and/or security keys used thereby.

As shown, a file to be shared is selected and labeled as shareable at 51. The file, once so labeled is effectively within a virtual magic folder. The virtual magic folder is similar to the magic folder of earlier embodiments, but does not require that the file be moved from its original location.

When the file is attached for transmission at 52 to another user, for example via email. The security layer verifies that the email application is semi-trusted, that the file is within the virtual magic folder and attaches the file in a secure form at 53 for being deciphered by a recipient thereof. Optionally, security policies are applied prior to attaching the file to the email in plain text. For example, at least one of the recipient, the sender and the file is assessed for security concerns.

The secured file is then transmitted at 54 to the recipient. Though the secured file remains secured, it is outside the security perimeter. Upon receiving the email, the recipient accessed the attached file and deciphers said file in order to access the contents thereof.

Figure 6:
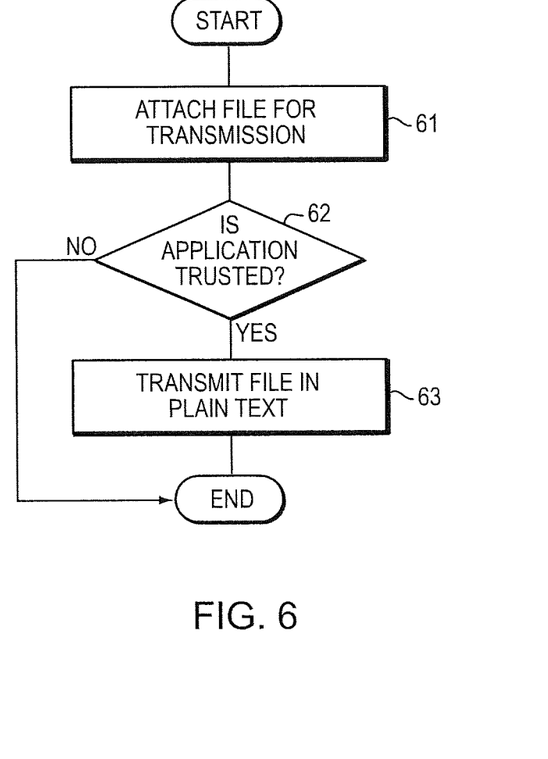
FIG. 6 is a simplified flow diagram of a method according to another embodiment wherein files are shared in plain text.

Referring to FIG. 6, shown is yet another embodiment. Here, each file is stored in situ in accordance with security policies of the security layer. Thus files are either secured or unsecured. Those files that are secured are accessible to trusted applications via the security layer and are maintained within the secure perimeter through limited access to the security layer and/or security keys used thereby.

As shown, a file to be shared is selected for transmission to another user at 61, for example via email. The security layer verifies that the email application is semi-trusted at 62 and attaches within the email the file in plain text. Optionally security policies are applied prior to attaching the file to the email in plain text. For example, at least one of the recipient, the sender and the file is assessed for security concerns.

Alternatively, the file is indicated as suited for sharing in advance. For example files with particular file types are shareable. Files that are suitable for sharing are effectively within a virtual magic folder. The virtual magic folder is similar to the magic folder of earlier embodiments, but does not require that the file be moved from its original location.

The file is then transmitted to the recipient at 63. Upon receiving the email, the recipient accessed the attached file that is attached in plain text.

Figure 7:
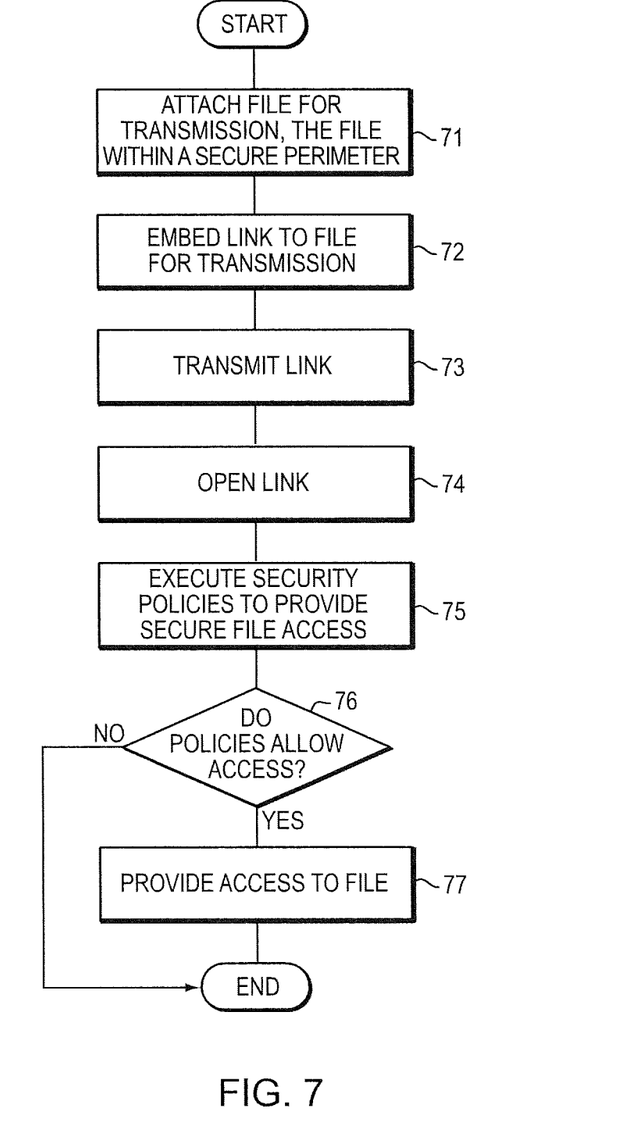
FIG. 7 is a simplified flow diagram of a method wherein files are accessed via a security portal.

Referring to FIG. 7, shown is yet another embodiment. Here, each file is stored in situ in accordance with security policies of the security layer. Thus files are either secured or unsecured. Those files that are secured are accessible to trusted applications via the security layer and are maintained within the secure perimeter through limited access to the security layer and/or security keys used thereby.

As shown, a file to be shared is selected for transmission to another user at 71, for example via email. The security layer embeds within the email a link for accessing the file via the security layer at 72 in place of the file, which is secured and would not be readable at the recipient's end of the communication path. Thus the email is transmitted with a link potentially allowing access via a security portal to the file at 73.

The email need not provide any information that might form a security breach. For example, the link provides an indication of the file to be shared that is identifiable to the security layer via a security portal but that is other than identifiable outside the secured system. Similarly, identification of details of the secured system or portal need not be shared other than its URL.

Upon receiving the email, the recipient clicks on the link at 74 and is interfaced with the security portal at 75. In its simplest implementation, the security portal provides access to the shared file in plain text. That said, through use of a security portal, it is possible to implement security protocols based on the security layer, the organizational preferences, the recipient identification, the recipient location, the time of day, the file to be shared, etc. In essence, security policy is manageable via the security portal upon an access attempt at 76.

For example, the security portal implements a single policy or a group of policies. A one-time access policy allows a file to be accessed one time only. In such a policy implementation, the security portal and/or the security layer allows access to the secure file one time, but then disallows further access thereto. Thus, the security portal allows a single access to a file or resource and then does not allow access thereto again via a same link.

Similarly, the secure portal optionally requires secure credential entry in order to provide file access. For example, a user name and password is required in order to access the files. Thus, though a file is shared via a link, user credentials are still required to access said file. In this way, even the sharing is limited by further security options, which optionally include biometrics, passwords, and hardware credentials.

Another policy that is enforceable involves network to network sharing. Here, files are exchangeable between related or authorized networks such that a link to a file allows the file to be opened from within another secure perimeter. Thus, a file shared via a link and from within a secured perimeter is only viewable and accessible from within another secured perimeter and more likely from within an authorized other secured perimeter. This allows for sharing of data and files between trusted entities having different security perimeters but that seek to allow file sharing therebetween. Alternatively, it allows for file sharing between two networks having same security perimeters but between whom logging of file transfers or limiting of file transfer is to be enforced.

Another policy relates to providing a security layer to support a file transfer in plain text. For example, the sharing is in accordance with a known security protocol. Alternatively, software is necessary on the recipient system to allow for access to the shared file. A simple example is executing software that secures the system against printing, saving or screen shots of the file in question in order to secure it against capture—allowing for read only access to the file one or more times.

Once the secure portal is accessed, policies for being enforced can be implemented and/or verified before file access is provided. A location of the requesting system, a time of day of the request, a frequency of the request, credentials of a requester, security within a system of the requester are all verifiable or some of the can be verified as intended and indicated by either the security portal or security policies.

When policies allow, access to the file is provided at 77.

According to an embodiment, a security layer exception is defined for a predetermined file type, such as for instance executable files. During use, a trusted application reads a secure data file, which is decrypted by the security layer upon access by the trusted application. The trusted application optionally modifies the data file and then initiates storage in plain-text form of the modified data, so as to write the modified data as a new data file of the above-mentioned predetermined file type. A non-trusted application, which reads the predetermined file type, subsequently accesses the stored plain-text data file. Of course, the trusted application is prevented from storing in plain-text form other data files that are not of the predetermined file type.

According to another embodiment, all data files of the predetermined type are stored in plain text. Such an embodiment supports aliases, for example, which are used by the operating system and are expected to be in plain text without trusting the operating system for every file access.

Continuing with the example of the debug script, the trusted compiler application accesses and stores data files in encrypted form, with deciphering and ciphering of the data being performed by the security layer. A trusted linker application access encrypted data files, but subsequently stores in plain-text form modified data files that are of the predetermined file type. The plain-text data files are then accessed by a non-trusted loader application. In this way, the loader is prevented from having global access to secured data—it is not trusted—via the file system of the computer operating system.

As will be apparent, a security breach may still occur if the plain-text data file contains confidential or secret data. For instance, a user wishing to distribute secured data that is stored within the security perimeter may attempt to write the data in a form of an exception data file type so that they appear to be of the predetermined file type. By way of an example, a text file may be saved by the linker with the .exe file extension in order to make it appear to be an executable file. The linker, a trusted application, has access to the secured text file in plain text and because of the exception for .exe would store the data in plain text.

According to another embodiment of the invention, in response to initiating storage in plain-text form of a data file of the predetermined file type, a service in the form of another application is launched to examine the data content of the data file. Since the data structures of many predetermined file types are known, a security risk presented by the data file is assessable. For example the application determines if the data file contains data other than the data of the known data structure; based on the determination, a risk associated with storing the plain-text data file is determined. If it is determined that the data file does not include data other than the data of the known data structure, then the data file is stored in plain-text form. On the other hand, if it is determined that the data file includes data other than the data of the known data structure, then a security action is performed, such as for instance generating a log entry and/or preventing storage of the data file in plain-text form. Optionally, the data file of the predetermined file type is examined after it has been stored. In this case, it is possible to limit the amount of secured data that is "leaked" by preventing further storage in plain-text form if it is determined that the data file includes data other than the data of the known data structure. Optionally, all storage of data in plain text by a trusted application is logged. Further optionally, some or all storage of data in plain text by a trusted application requires authentication.

Figure 8:
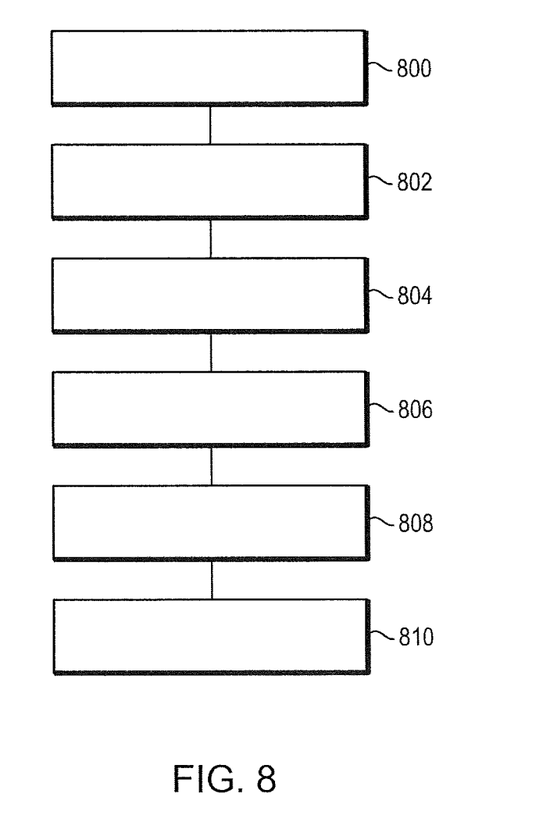
FIG. 8 is a simplified flow diagram of a method of de-securing data based on a known criteria in order to render it accessible by an untrusted application.

Referring to FIG. 8, shown is a flow diagram of a method according to an embodiment of the invention. A security layer is provided at 800, for maintaining security within a security perimeter of a secure system, such as for instance the secure system of FIG. 1. The security layer encrypts and decrypts data during access by trusted applications, but does not perform these security functions for non-trusted applications. At 802 a set of folders, having secured data stored therein, is provided within the secure system, such as for instance the storage 13. A trusted application is provided at 804 for accessing stored secured data from within the set of folders. In particular, the stored secured data is stored in a ciphered form and deciphered by the security layer when accessed by the trusted application. At 806 a non-trusted application is provided other than for accessing stored secured data from within the set of folders, and for accessing a predetermined file type stored in plain-text form within the set of folders. The trusted application accesses a first data file at 808, the first data file forming at least a portion of the stored secured data and being other than the predetermined file type. After modifying the data of the first data file, the trusted application stores a second data file in plain-text form within the set of folders at 810, the second data file based on the first data file and being the predetermined file type. The non-trusted application subsequently accesses the second data file, which is in plain-text form, and does not require any decrypting by the security layer.

Optionally, a step of verifying the storing of the second data file of the predetermined file type against policy data is performed, in order to determine an authorization result. In response to determining that the storing should other than be authorized, the storing of the second data file is prevented. For instance, the policy data relates to a predetermined maximum number of storage operations within a time period, or to allowable storage locations within the secure system, etc. Optionally, verifying includes determining if the predetermined file type is a file type that is permitted to be stored in plain text form, such as for instance verifying that the predetermined file type is an exception defined by the security layer. Further optionally, a log entry is generated, such as for instance in response to storing the second data file of the predetermined file type.

Figure 9:
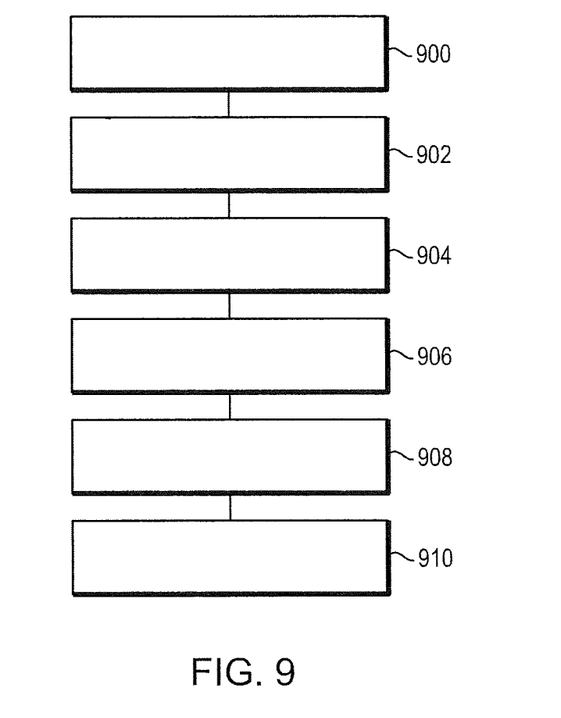
FIG. 9 is a simplified flow diagram of a method of de-securing data based on a known criteria in order to render it accessible by an untrusted application.

Referring now to FIG. 9, shown is a flow diagram of a method according to another embodiment of the invention. A security layer is provided at 900, for maintaining security within a security perimeter of a secure system, such as for instance the secure system of FIG. 1. At 902 a ciphered data file is provided, stored within the security perimeter, the ciphered data file secured according to a security protocol and accessible to a trusted application and other than accessible to a non-trusted application in a deciphered form. At 904 the trusted application accesses the ciphered data file, which comprises deciphering the ciphered data file by the security layer when the ciphered data file is accessed by the trusted application. At 906 the trusted application initiates storage of a plain-text data file, based on the ciphered data file, the plain-text data file being a file type different than the ciphered data file. More particularly, the file type is an exception defined by the security layer. At 908 the data of the plain-text data file is analyzed, and based on the analyzing, a risk associated with storing the plain-text data file is determined at 910. The non-trusted application subsequently accesses the plain-text data file.

In the method that is discussed with reference to FIG. 9, the file type has a known data structure, and the step of analyzing the plain-text data file may comprise determining if the data file includes data other than data of the known data structure. The risk associated with storing the plain-text data file is based at least partly on the result of determining. For instance, if the plain-text data file appears to contain either too much data or too little data than is expected for the known data structure, then a higher level of risk is assessed.

When the determined risk is within a predetermined range of values, then the data file is stored in plain-text form. Optionally, a log entry is generated in response to the data file being stored in plain-text form. When the determined risk is outside the predetermined range of values, then optionally the data file is not stored or the data file is stored and a security action is performed. For instance, the security action includes generating a log entry.

Figure 10:
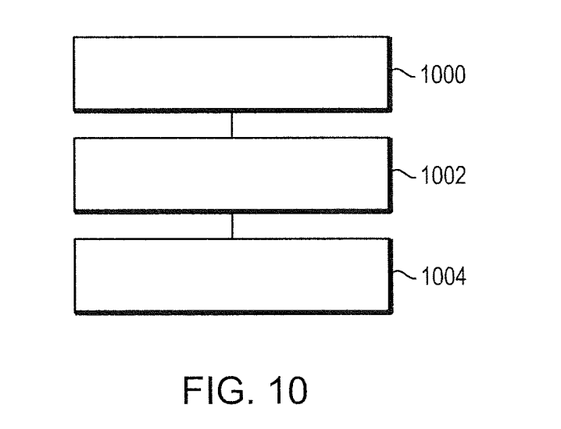
FIG. 10 is a simplified flow diagram of a method according to an embodiment.

Referring to FIG. 10, shown is a flow diagram of a method according to another embodiment of the invention. A security layer is provided at 1000, for maintaining security within a security perimeter of a secure system, such as for instance the secure system of FIG. 1. The security layer encrypts and decrypts data during access by trusted applications, but does not perform these security functions for non-trusted applications. At 1002 a security layer exception is defined, supporting storing of data files of a predetermined file type in plain-text form, the predetermined file type having a known data structure. At 1004, in response to a call by a trusted application to store in plain-text form a data file of the predetermined file type, the data structure of the data file is analyzed to determine if the data file includes data other than data of the known data structure.

When it is determined that the data file does not include data other than data of the known data structure, then the data file is stored in plain-text form. Optionally, a log entry is generated in response to the data file being stored in plain-text form. On the other hand, when it is determined that the data file includes data other than data of the known data structure a security action is performed. For instance, the security action comprises generating a log entry. Optionally, the data file is stored or the data file is not stored.

Advantageously, a trusted application accessing stored secured data is provided access to the data in plain-text form, subsequent to the secured data being decrypted by a security layer. The security layer encrypts modified data that are provided from the trusted application prior to storing the modified data, except when the modified data are to be stored as a data file of a predetermined type for which a security layer exception is defined. A non-trusted application accessing stored secured data is provided with secured data only, thereby preventing leakage of the data in plain-text form. At the same time, the non-trusted application is provided access to data of the predetermined file type in plain-text form.

The term trusted application is used herein to refer to applications that are trusted. For example, an application is verified by security personnel and is then digitally signed. Each time the application is executed, the digital signature is verified in order to verify that the application is unaltered.

In another example, a non-trusted application in the form of the operating system includes file identifiers, commonly referred to as shortcuts or aliases. Using trusted applications, file identifiers are stored in encrypted form and are unusable to the file system. Using the file system, a file identifier of any file is easily creatable and manageable. Thus file identifiers are a good candidate for being exceptions. Unfortunately, in for example Windows® the shortcut file type does not restrict contents of a shortcut file, so when a shortcut is created within a trusted application, according to the above embodiments, it is possible to store secret data within the shortcut file. Therefore, the above noted embodiments allow the security layer to analyse shortcuts when formed to evaluate a risk associated therewith and to act accordingly by blocking storage of the file identifier, deleting the file identifier, and/or logging the event.

Numerous other embodiments may be envisaged without departing from the scope of the instant invention.

What is claimed is:

1. A method comprising:
   providing a security layer for maintaining security within a security perimeter;
   providing a first set of folders having first secured data stored therein;
   providing a sharing folder having second secured data stored therein;
   providing a trusted application for accessing the stored first secured data from within the first set of folders, the stored first secured data stored in a ciphered form and deciphered by the security layer when accessed by the trusted application;

providing a semi-trusted application for accessing the second secured data from within the sharing folder, the second secured data stored in a ciphered form and deciphered by the security layer when accessed by the semi-trusted application, wherein the semi-trusted application is for sharing the deciphered second secured data with a destination outside the security perimeter and wherein the semi-trusted application is not authorized to access stored secured data deciphered by the security layer from within the first set of folders;

accessing a first data file by the trusted application, the first data file forming at least a portion of the stored first secured data stored within the first set of folders;

using the trusted application, storing a second data file within the sharing folder, the second data file based on the first data file and forming at least a portion of the second secured data stored within the sharing folder;

accessing the second data file by the semi-trusted application, wherein the security layer deciphers the second data file when accessed by the semi-trusted application; and using the semi-trusted application, sharing the deciphered second data file outside the security perimeter.

2. The method as defined in claim 1 wherein the first secured data comprises stored ciphered data secured with a cipher key.

3. The method as defined in claim 2 wherein the semi-trusted application is provided access to deciphered data from a ciphered data file by the security layer when the cipher data file is stored within the sharing folder and is other than provided access to a deciphered version of an exact same data file as the ciphered data file by the security layer when the exact same data is stored outside the sharing folder.

4. The method as defined in claim 3 wherein the security layer acts to decipher data for the trusted application and to only decipher data for the semi-trusted application when that data is stored within the sharing folder.

5. The method as defined in claim 1 wherein the security perimeter is a virtual security perimeter defining a virtual communication network having data secured therein.

6. The method as defined in claim 1 comprising:
generating a log entry upon storing of the second data file within the sharing folder by the trusted application.

7. A method according to claim 1 wherein storing the second data file within the sharing folder by the trusted application comprises:
requesting user authorization data,
verifying the user authorization data, and
in response to verifying the user authorization data, authorizing the storing operation.

8. A method comprising:
providing a security layer for maintaining security within a security perimeter;
providing a set of folders having secured data stored therein;
providing a trusted application for accessing stored secured data from within the set of folders, the stored secured data stored in a ciphered form and deciphered by the security layer when accessed by the trusted application and re-secured when stored by the trusted application, the security layer configured to not cipher data stored by the trusted application in a first predetermined file type;
providing a non-trusted application for accessing data stored in plain text and not for accessing data deciphered by the security layer;
accessing a first data file by the trusted application, the first data file forming at least a portion of the stored secured data and being a second predetermined file type, wherein the first predetermined data type is not the same as the second predetermined data type; and
using the trusted application, storing a second data file of the first predetermined file type, the second data file based on the first data file,
the security layer for securing the first data file when saved and for other than securing the second data file.

9. The method as defined in claim 8 comprising accessing the second data file by the non-trusted application.

10. The method as defined in claim 8 comprising verifying the storing of the second data file of the first predetermined file type against policy data to determine an authorization result, and in response to determining that the storing should not be authorized, preventing the storing of the second data file.

11. The method as defined in claim 10 wherein verifying comprises analyzing a content of the second data file against an expected content of the second data file.

12. The method as defined in claim 8 comprising, in response to storing the second data file of the first predetermined file type, generating a log entry.

13. The method as defined in claim 8 wherein the first predetermined file type is an exception defined by the security layer.

* * * * *